「(12) United States Patent
Hayashi

(10) Patent No.: US 7,066,836 B2
(45) Date of Patent: Jun. 27, 2006

(54) GOLF BALL

(75) Inventor: Junji Hayashi, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 122 days.

(21) Appl. No.: 10/771,235

(22) Filed: Feb. 4, 2004

(65) Prior Publication Data

US 2005/0170910 A1   Aug. 4, 2005

(51) Int. Cl.
*A63B 37/06* (2006.01)

(52) U.S. Cl. ..................................... 473/373

(58) Field of Classification Search ............. 473/373, 473/374, 376
See application file for complete search history.

(56) References Cited

U.S. PATENT DOCUMENTS

| | | | |
|---|---|---|---|
| 5,252,652 A * | 10/1993 | Egashira et al. | 524/392 |
| 5,306,760 A | 4/1994 | Sullivan | |
| 5,312,857 A | 5/1994 | Sullivan | |
| 5,795,247 A | 8/1998 | Yokota et al. | |
| 5,830,085 A | 11/1998 | Higuchi et al. | |
| 5,967,908 A | 10/1999 | Yamagishi et al. | |
| 6,565,455 B1 | 5/2003 | Hayashi et al. | |
| 6,632,148 B1 | 10/2003 | Hayashi et al. | |
| 2001/0018375 A1 * | 8/2001 | Hayashi et al. | 473/371 |
| 2002/0137848 A1 | 9/2002 | Sone et al. | |
| 2003/0008730 A1 * | 1/2003 | Hayashi et al. | 473/384 |

FOREIGN PATENT DOCUMENTS

| | | | |
|---|---|---|---|
| JP | 07-268132 A | 10/1995 | |
| JP | 08-276033 A | 10/1996 | |
| JP | 09-313643 A | 12/1997 | |
| JP | 10-305114 A | 11/1998 | |
| JP | 11-035633 A | 2/1999 | |
| JP | 11-164912 A | 6/1999 | |
| JP | 2001-218873 A | 8/2001 | |
| JP | 2002-210042 A | 7/2002 | |
| JP | 2002-293996 A | 10/2002 | |
| WO | WO 98/46671 A1 | 10/1998 | |

OTHER PUBLICATIONS

C. Jeff Harlan et al.; "Three-Coordinate Aluminum Is Not A Prerequisite for Catalytic Activity In The Zirconocene-Alumoxane Polymerization Of Ethylele"; American Chemical Society; 117; 1995; pp. 6465-6474.

Mark R. Mason et al.; "Hydrolysis of Tri-*tert*-butylaluminum: The First Structural Characterization of Alkylalumoxanes $[(R_2Al)_2O]_n$ and $(RAIO)_n$,"; American Chemical Society; 115; 1993; pp. 4971-4984.

"Reaction Mechanisms in Metallocene Catalyzed Olefin Polymerization"; Report of Research & Development, Fine Chemical, vol. 23, No. 9; 1994; pp. 5-15.

* cited by examiner

*Primary Examiner*—Raeann Gorden
(74) *Attorney, Agent, or Firm*—Sughrue Mion, PLLC

(57) ABSTRACT

A golf ball having a core, an intermediate layer enclosing the core and a cover enclosing the intermediate layer is characterized in that the intermediate layer and cover are each made from an ionomer resin-containing thermoplastic resin. The golf ball is also characterized in that the core has a diameter of at least 36.7 mm but not more than 40.7 mm, the core has a deflection when subjected to a load of 100 kg of at least 3.5 but not more than 6.0 mm, the intermediate layer has a thickness of at least 0.50 mm but not more than 1.40 mm, the intermediate layer has a Shore D hardness of at least 40 but not more than 55, the cover has a thickness of at least 0.50 mm but not more than 1.40 mm, the cover has a Shore D hardness of at least 60 but not more than 70, the golf ball has a deflection when subjected to a load of 100 kg of at least 2.8 mm but not more than 4.5 mm, and the deflection by the core under 100 kg load minus the deflection by the golf ball under 100 kg load is less than 1.0 mm.

10 Claims, No Drawings

GOLF BALL

BACKGROUND OF THE INVENTION

The present invention relates to a golf ball which has a high rebound, a low spin and a good feel upon impact, and is thus suitable for the ordinary amateur golfer who places greater importance on the distance and feel of the ball than its spin performance.

Recently, as the golfing population has grown, the qualities that golfers desire in a golf ball have become more diverse and individualized. Various efforts have been made to develop balls with constructions that satisfy such desires.

For example, U.S. Pat. No. 5,830,085, discloses a golf ball in which providing the core with a proper hardness distribution and also providing the overall golf ball with a proper hardness distribution enables all of the following qualities to be achieved: good flight performance, good durability, good feel upon impact and good controllability.

U.S. Pat. No. 5,967,908, discloses a golf ball which has a large number of dimples on the surface of the cover, and in which the hardness balance between the core, intermediate layer and cover has been optimized and the dimples have also been optimized. These characteristics provide the golf ball with a good feel on impact and a good flight performance regardless of the head speed at which it is struck.

U.S. Pat. No. 6,565,455, describes a golf ball in which the intermediate layer and/or cover are made of specific materials and the Shore D hardness of each layer is set within specific ranges, thereby causing the forces applied to the ball when it is struck to be effectively dispersed throughout the ball so that energy loss during ball deformation is reduced, enhancing both rebound and carry. This ball is also thereby conferred with both a soft feel and a good spin performance (controllability).

U.S. Pat. No. 6,632,148 describes a golf ball in which, by specifying the JIS-C hardness at the center of the core, the JIS-C hardness at the surface of the core and the core diameter, specifying the material, JIS-C hardness and thickness of the intermediate layer and specifying the material, JIS-C hardness and thickness of the cover, and by at the same time optimizing the JIS-C hardness difference between the intermediate layer and the core surface, the JIS-C hardness difference between the cover and the intermediate layer, the hardness distribution between the core, intermediate layer and cover, and the dimple arrangement, there can be obtained a very soft feel upon impact yet a good durability, reduced flight variability, a straight flight path and increased carry owing to a low spin, a high launch angle and high rebound.

However, there is room for further improvement in these golf balls from the standpoint of achieving a better rebound, a lower spin and a soft feel.

U.S. Pat. No. 5,795,247 discloses art for achieving a low spin upon impact and a high launch angle by providing a large hardness difference between the core and the golf ball. However, because this golf ball has a large difference in deformation between the core and the cover at the time of impact and is thus prone to a loss of energy, there is room for further improvement in terms of rebound. Moreover, this golf ball has a relatively thick cover. Therefore, when a soft cover is used, the ball undergoes a decrease in rebound and takes on excessive spin, resulting in a reduced carry. On the other hand, the use of a hard cover tends to lead to a poor feel upon impact. Hence, there is room for improvement with respect to these characteristics as well.

SUMMARY OF THE INVENTION

The object of the invention is to provide a golf ball which is capable of attaining a high rebound, a low spin and a good feel upon impact when used by an ordinary amateur golfer who places greater importance on the distance and feel of the ball than its spin performance.

The inventors have conducted extensive investigations in order to achieve the above object. As a result, they have discovered that, in a golf ball having a core, an intermediate layer enclosing the core and a cover enclosing the intermediate layer, by having the intermediate layer and cover each made from an ionomer-containing thermoplastic resin and at the same time optimizing the core diameter, the deflection of the core when subjected to a load of 100 kg, the intermediate layer thickness, the Shore D hardness of the intermediate layer, the cover thickness, the Shore D hardness of the cover, the deflection of the golf ball when subjected to a load of 100 kg, and the deflection by the core under a 100 kg load minus the deflection by the golf ball under a 100 kg load, there can be obtained a golf ball which is capable of attaining a high rebound, a low spin and a good feel upon impact when used by an ordinary amateur golfer who places greater importance on the distance and feel of the ball than its spin performance.

Accordingly, the invention provides the following golf balls.

[I] A golf ball comprising a core, an intermediate layer enclosing the core and a cover enclosing the intermediate layer, characterized in that the intermediate layer and cover are each made from an ionomer resin-containing thermoplastic resin and in that the golf ball satisfies following conditions (1) to (8):

(1) the core has a diameter of at least 36.7 mm but not more than 40.7 mm;

(2) the core has a deflection when subjected to a load of 100 kg of at least 3.5 but not more than 6.0 mm;

(3) the intermediate layer has a thickness of at least 0.50 mm but not more than 1.40 mm;

(4) the intermediate layer has a Shore D hardness of at least 40 but not more than 55;

(5) the cover has a thickness of at least 0.50 mm but not more than 1.40 mm;

(6) the cover has a Shore D hardness of at least 60 but not more than 70;

(7) the golf ball has a deflection when subjected to a load of 100 kg of at least 2.8 mm but not more than 4.5 mm; and (8) (deflection by core under 100 kg load)−(deflection by golf ball under 100 kg load)<1.0 mm.

[II] The golf ball of [I] wherein:

the core is obtained by molding and vulcanizing a rubber composition comprising 100 parts by weight of a base rubber which includes 60 to 100 wt % of a polybutadiene of at least 60% cis-1,4 structure, has a Mooney viscosity ($ML_{1+4}$ (100° C.)) of at least 40 and is synthesized using a rare earth catalyst, 10 to 60 parts by weight of an unsaturated carboxylic acid and/or an unsaturated carboxylic acid metal salt, 0.1 to 5 parts by weight of an organosulfur compound, 5 to 80 parts by weight of an inorganic filler, and 0.1 to 0.8 part by weight overall of at least two different organic peroxides which have, letting the organic peroxide with the shortest half-life at 155° C. be (p), the organic peroxide with the longest half-life at 155° C. be (q), the half-life of (p) be $P_t$ and the half-life of (q) be $q_t$, a half-life ratio $q_t/p_t$ of at least 7 but not more than 20;

the intermediate layer is made from a thermoplastic resin containing at least 30 wt % of an ionomer resin;

the cover is made from a thermoplastic resin containing at least 50 wt % of an ionomer resin; and the golf ball satisfies following condition (9):

(9) (Shore D hardness of cover)−(Shore D hardness of intermediate layer)≦10.

[III] The golf ball of [I] which additionally satisfies following condition (10):

(10) 10≦(Shore D hardness at core surface)−(Shore D hardness at core center)≦30.

[IV] The golf ball of [I], wherein the core contains 0.05 to 5 parts by weight of sulfur per 100 parts by weight of the base rubber.

[V] The golf ball of [I], wherein the intermediate layer is composed of (a) 100 parts by weight of an olefin-unsaturated carboxylic acid random copolymer and/or an olefin-unsaturated carboxylic acid-unsaturated carboxylic acid ester random copolymer, (b) 5 to 80 parts by weight of a fatty acid having a molecular weight of at least 280 or a derivative thereof, and (c) 0.1 to 10 parts by weight of a basic inorganic metal compound capable of neutralizing acid groups on components (a) and (b).

[VI] The golf ball of [I], wherein the intermediate layer is composed of (d) 100 parts by weight of a metal ion neutralization product of an olefin-unsaturated carboxylic acid random copolymer and/or a metal ion neutralization product of an olefin-unsaturated carboxylic acid-unsaturated carboxylic acid ester random copolymer, (b) 5 to 80 parts by weight of a fatty acid having a molecular weight of at least 280 or a derivative thereof, and (c) 0.1 to 10 parts by weight of a basic inorganic metal compound capable of neutralizing acid groups on components (d) and (b).

[VII] The golf ball of [I], wherein the intermediate layer is composed of 100 parts by weight of a mixture of (a) an olefin-unsaturated carboxylic acid random copolymer and/or an olefin-unsaturated carboxylic acid-unsaturated carboxylic acid ester random copolymer with (d) a metal ion neutralization product of an olefin-unsaturated carboxylic acid random copolymer and/or a metal ion neutralization product of an olefin-unsaturated carboxylic acid-unsaturated carboxylic acid ester random copolymer, (b) 5 to 80 parts by weight of a fatty acid having a molecular weight of at least 280 or a derivative thereof, and (c) 0.1 to 10 parts by weight of a basic inorganic metal compound capable of neutralizing acid groups on components (a), (d) and (b).

[VIII] The golf ball of [I], wherein the cover includes 5 to 35 parts by weight of barium sulfate per 100 parts by weight of the ionomer resin.

[IX] The golf ball of [I] which additionally satisfies following condition (11):

(11) the intermediate layer and the cover have melt flow rates of at least 1.6 dg/min.

[X] The golf ball of [I] which additionally satisfies following condition (12):

(12) the intermediate layer and cover have a combined thickness of at least 1.20 mm but not more than 2.80 mm.

DETAILED DESCRIPTION OF THE INVENTION

The invention is described more fully below.

The golf ball of the invention is a golf ball having a core, an intermediate layer enclosing the core and a cover enclosing the intermediate layer, the ball being characterized in that the intermediate layer and cover are each made from an ionomer resin-containing thermoplastic resin and in that following conditions (1) to (8) are satisfied:

(1) the core has a diameter of at least 36.7 mm but not more than 40.7 mm;

(2) the core has a deflection when subjected to a load of 100 kg of at least 3.5 but not more than 6.0 mm;

(3) the intermediate layer has a thickness of at least 0.50 mm but not more than 1.40 mm;

(4) the intermediate layer has a Shore D hardness of at least 40 but not more than 55;

(5) the cover has a thickness of at least 0.50 mm but not more than 1.40 mm;

(6) the cover has a Shore D hardness of at least 60 but not more than 70;

(7) the golf ball has a deflection when subjected to a load of 100 kg of at least 2.8 mm but not more than 4.5 mm; and (8) (deflection by core under 100 kg load)−(deflection by golf ball under 100 kg load)<1.0 mm.

To achieve a golf ball which has a soft feel, a high rebound and a reduced spin, it is preferable for the core in the invention to be obtained by molding and vulcanizing a rubber composition containing:

(A) a base rubber which includes 60 to 100 wt % of a polybutadiene of at least 60% cis-1,4 structure, has a Mooney viscosity ($ML_{1+4}$ (100° C.)) of at least 40 and is synthesized using a rare earth catalyst;

(B) an unsaturated carboxylic acid and/or an unsaturated carboxylic acid metal salt;

(C) an organosulfur compound;

(D) an inorganic filler; and (E) an organic peroxide.

By having the core, which accounts for a high proportion of the golf ball volume, made from this type of material, the golf ball can be designed so as to have a soft feel and a high rebound.

The polybutadiene in component A has a cis-1,4 unit content on the polymer chain of generally at least 60 wt %, preferably at least 80 wt %, more preferably at least 90 wt %, and even more preferably at least 95 wt %. A polybutadiene having too low a cis-1,4 unit content may lower the resilience.

Moreover, the polybutadiene has a 1,2-vinyl unit content on the polymer chain of generally not more than 2%, preferably not more than 1.7%, and even more preferably not more than 1.5%. Too high a 1,2-vinyl unit content may lower the resilience.

To obtain a rubber composition having excellent resilience, or to obtain a rubber composition having a good extrusion workability, the polybutadiene has a Mooney viscosity ($ML_{1+4}$ (100° C.)) of generally at least 30, preferably at least 40, more preferably at least 50, and even preferably at least 52, but generally not more than 140, preferably not more than 120, more preferably not more than 100, and even more preferably not more than 80.

The term "Mooney viscosity" used herein refers to an industrial index of viscosity (JIS K6300) as measured with a Mooney viscometer, which is a type of rotary plastometer. The unit symbol used here is $ML_{1+4}$ (100° C.), where "M" stands for Mooney viscosity, "L" stands for large rotor (L-type), and "1+4" stands for a pre-heating time of 1 minute and a rotor rotation time of 4 minutes. The "100° C." indicates that measurement was carried out at a temperature of 100° C.

To obtain a molded and vulcanized rubber composition of good resilience, the polybutadiene used in the invention is preferably synthesized with a rare-earth catalyst or a group VIII metal compound catalyst. Polybutadiene synthesized with a rare-earth catalyst is especially preferred.

Such rare-earth catalysts are not subject to any particular limitation. Exemplary rare-earth catalysts include those made up of a combination of a lanthanide series rare-earth compound with an organoaluminum compound, an alumoxane, a halogen-bearing compound and an optional Lewis base.

Examples of suitable lanthanide series rare-earth compounds include halides, carboxylates, alcoholates, thioalcoholates and amides of atomic number 57 to 71 metals.

Organoaluminum compounds that may be used include those of the formula $AlR^1R^2R^3$ (wherein $R^1$, $R^2$ and $R^3$ are each independently a hydrogen or a hydrocarbon group of 1 to 8 carbons).

Preferred alumoxanes include compounds of the structures shown in formulas (I) and (II) below. The alumoxane association complexes described in Fine Chemical 23, No. 9, 5 (1994), J. Am. Chem. Soc. 115, 4971 (1993), and J. Am. Chem. Soc. 117, 6465 (1995) are also acceptable.

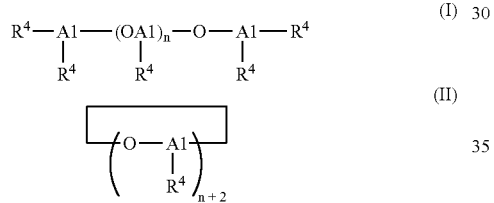

In the above formulas, $R^4$ is a hydrocarbon group having 1 to 20 carbon atoms, and n is 2 or a larger integer.

Examples of halogen-bearing compounds that may be used include aluminum halides of the formula $AlX_nR_{3-n}$ (wherein X is a halogen; R is a hydrocarbon group of 1 to 20 carbons, such as an alkyl, aryl or aralkyl; and n is 1, 1.5, 2 or 3); strontium halides such as $Me_3SrCl$, $Me_2SrCl_2$, $MeSrHCl_2$ and $MeSrCl_3$; and other metal halides such as silicon tetrachloride, tin tetrachloride and titanium tetrachloride.

The Lewis base may be any Lewis base that can be used to form a complex with the lanthanide series rare-earth compound. Illustrative examples include acetylacetone and ketone alcohols.

In the invention, the use of a neodymium catalyst in which a neodymium compound serves as the lanthanide series rare-earth compound is advantageous because it enables a polybutadiene rubber having a high cis-1,4 unit content and a low 1,2-vinyl unit content to be obtained at an excellent polymerization activity. Preferred examples of such rare-earth catalysts include those mentioned in JP-A 11-35633, JP-A 11-164912 and JP-A 2002-293996.

To achieve a polybutadiene having a cis unit content within the above range and a polydispersity index Mw/Mn within the subsequently described range, it is preferable for the polymerization of butadiene in the presence of a rare-earth catalyst containing a lanthanide series rare-earth compound to be carried out at a butadiene/(lanthanide series rare-earth compound) molar ratio of generally 1,000 to 2,000,000, and especially 5,000 to 1,000,000, and at an $AlR^1R^2R^3$/(lanthanide series rare-earth compound) molar ratio of generally 1 to 1,000, and especially 3 to 500. It is also preferable for the (halogen compound)/(lanthanide series rare-earth compound) molar ratio to be generally 0.1 to 30, and especially 0.2 to 15, and for the (Lewis base)/(lanthanide series rare-earth compound) molar ratio to be generally 0 to 30, and especially 1 to 10.

The polymerization of butadiene in the presence of a rare-earth catalyst may be carried out by bulk polymerization or vapor phase polymerization, either with or without the use of solvent, and at a polymerization temperature of generally −30 to 150° C., and preferably 10 to 100° C.

In the invention, the polybutadiene included in component A may instead be one obtained by polymerizing butadiene using the above-described rare-earth catalyst, then reacting a terminal modifier with active end groups on the polymer.

Such modified polybutadiene rubbers can be obtained by polymerization as described above, followed by the use of a terminal modifier selected from among types (i) to (vii) below.

(i) Compounds having an alkoxysiliy group to be reacted with the polymer at active ends thereof. Preferred alkoxysilyl group-bearing compounds are alkoxysilane compounds having at least one epoxy group or isocyanate group on the molecule. Specific examples include epoxy group-bearing alkoxysilanes such as 3-glycidyloxypropyltrimethoxysilane, 3-glycidyloxypropyltriethoxysilane, (3-glycidyloxypropyl)methyldimethoxysilane, (3-glycidyloxypropyl)methyldiethoxysilane, β-(3,4-epoxycyclohexyl)trimethoxysilane, β-(3,4-epoxycyclohexyl)triethoxysilane, β-(3,4-epoxycyclohexyl)methyldimethoxysilane, β-(3,4-epoxycyclohexyl)ethyldimethoxysilane, condensation products of 3-glycidyloxypropyltrimethoxysilane and condensation products of (3-glycidyloxypropyl)methyldimethoxysilane; and isocyanate group-bearing alkoxysilane compounds such as 3-isocyanatopropyltrimethoxysilane, 3-isocyanatopropyltriethoxysilane, (3-isocyanatopropyl)methyldimethoxysilane, (3-isocyanatopropyl)methyldiethoxysilane, condensation products of 3-isocyanatopropyltrimethoxysilane and condensation products of (3-isocyanatopropyl)methyldimethoxysilane.

A Lewis acid may be added to accelerate the reaction when the above alkoxysilyl group-bearing compound is reacted with active end groups on the polymer. The Lewis acid acts as a catalyst to promote the coupling reaction, thus improving cold flow by the modified polymer and providing a better shelf stability. Examples of suitable Lewis acids include dialkyltin dialkyl malates, dialkyltin dicarboxylates and aluminum trialkoxides.

Other types of terminal modifiers that may be used include:

(ii) halogenated organometallic compounds, halogenated metallic compounds and organometallic compounds of the general formulas $R^5_nM'X_{4-n}$, $M'X_4$, $M'X_3$, $R^5_nM'(-R^6-COOR^7)_{4-n}$ or $R^5_nM'(-R^6-COR^7)_{4-n}$ (wherein $R^5$ and $R^6$ are each independently a hydrocarbon group of 1 to 20 carbons; $R^7$ is a hydrocarbon group of 1 to 20 carbons which may contain pendant carbonyl or ester groups; M' is a tin, silicon, germanium or phosphorus atom; X is a halogen atom; and n is an integer from 0 to 3);

(iii) heterocumulene compounds having on the molecule a Y=C=Z linkage (wherein Y is a carbon, oxygen, nitrogen or sulfur atom; and Z is an oxygen, nitrogen or sulfur atom);
(iv) three-membered heterocyclic compounds containing on the molecule the following bonds

(wherein Y is an oxygen, nitrogen or sulfur atom);
(v) halogenated isocyano compounds;
(vi) carboxylic acids, acid halides, ester compounds, carbonate compounds and acid anhydrides of the formula $R^8$—$(COOH)_m$, $R^9(COX)_m$, $R^{10}$—$(COO$—$R^{11})_m$, $R^{12}$—$OCOO$—$R^{13}$, $R^{14}$—$(COOCO$—$R^{15})_m$ or

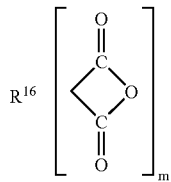

(wherein $R^8$ to $R^{16}$ are each independently a hydrocarbon group of 1 to 50 carbons, X is a halogen atom, and m is an integer from 1 to 5); and
(vii) carboxylic acid metal salts of the formula $R^{17}{}_1M''(OCOR^{18})_{4-1}$, $R^{19}{}_1M''(OCO$—$R^{20}$—$COOR^{21})_{4-1}$ or

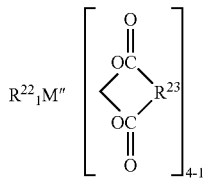

(wherein $R^{17}$ to $R^{23}$ are each independently a hydrocarbon group of 1 to 20 carbons, M″ is a tin, silicon or germanium atom, and the letter 1 is an integer from 0 to 3).

Specific examples of the above terminal modifiers and methods for their reaction are described in, for example, JP-A 11-35633, JP-A 7-268132 and JP-A 2002-293996.

The above-mentioned group VIII catalyst is not subject to any particular limitation. Exemplary group VIII catalysts include the following nickel catalysts and cobalt catalysts.

Examples of suitable nickel catalysts include single-component systems such as nickel-kieselguhr, binary systems such as Raney nickel/titanium tetrachloride, and ternary systems such as nickel compound/organometallic compound/boron trifluoride etherate. Exemplary nickel compounds include reduced nickel on a carrier, Raney nickel, nickel oxide, nickel carboxylate and organonickel complex salts. Exemplary organometallic compounds include trialkylaluminum compounds such as triethylaluminum, tri-n-propylaluminum, triisobutylaluminum and tri-n-hexylaluminum; alkyllithium compounds such as n-butyllithium, sec-butyllithium, tert-butyllithium and 1,4-dilithiumbutane; and dialkylzinc compounds such as diethylzinc and dibutylzinc.

Examples of suitable cobalt catalysts include cobalt and cobalt compounds such as Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyldithiocarbamate, cobalt anilinium nitrite and cobalt dinitrosyl chloride. It is particularly advantageous to use these compounds in combination with, for example, a dialkylaluminum monochloride such as diethylaluminum monochloride or diisobutylaluminum monochloride; a trialkylaluminum such as triethylaluminum, tri-n-propylaluminum, triisobutylaluminum or tri-n-hexylaluminum; an alkylaluminum sesquichloride such as ethylaluminum sesquichloride; or aluminum chloride.

Synthesis of the above-described polybutadiene in the invention using the group VIII catalysts described above, and particularly a nickel or cobalt catalyst, can be carried out by a process in which the nickel catalyst or cobalt catalyst typically is continuously charged into a reactor together with a solvent and butadiene monomer, and the reaction conditions are suitably selected, such as a reaction temperature in a range of 5 to 60° C. and a reaction pressure in a range of atmospheric pressure to 70 plus atmospheres, so as to yield a product having the above-indicated Mooney viscosity.

The polybutadiene in the invention has a polydispersity index Mw/Mn (where Mw is the weight-average molecular weight, and Mn is the number-average molecular weight) of generally at least 2.0, preferably at least 2.2, more preferably at least 2.4, and even more preferably at least 2.6, but generally not more than 8.0, preferably not more than 7.5, even more preferably not more than 4.0, and most preferably not more than 3.4. A polydispersity Mw/Mn which is too small may lower the workability, whereas one that is too large may lower the resilience.

Component A in the invention is a base rubber containing a polybutadiene like that described above. The above-described polybutadiene having a cis-1,4 unit content of at least 60% generally accounts for at least 60 wt %, preferably at least 70 wt %, more preferably at least 80 wt %, and most preferably at least 85 wt %, of component A. The content of the above polybutadiene in the base rubber may be as much as 100 wt %, although the polybutadiene content can be set to 95 wt % or less, and in some cases to 90 wt % or less. A base rubber in which the content of polybutadiene having a cis-1,4 unit content of at least 60% is too low may result in the golf ball having a poor rebound.

Rubber components other than the above-described polybutadiene may be included in the base rubber, insofar as the objects of the invention are attainable. Examples of such additional rubber components that may be used include polybutadienes other than the above-described polybutadiene, and other diene rubbers, such as styrene-butadiene rubbers, natural rubbers, isoprene rubbers and ethylene-propylene-diene rubbers.

Component B is an unsaturated carboxylic acid and/or an unsaturated carboxylic acid metal salt. Examples of suitable unsaturated carboxylic acids include acrylic acid, methacrylic acid, maleic acid and fumaric acid. Acrylic acid and methacrylic acid are especially preferred. Examples of suitable unsaturated carboxylic acid metal salts include zinc salts and magnesium salts of the above unsaturated carboxylic acids. Of these, zinc acrylate is especially preferred.

The amount of this component B per 100 parts ("parts" refers hereinafter to parts by weight) of above-described component A is generally at least 10 parts, preferably at least 13 parts, more preferably at least 16 parts, even more preferably at least 18 parts, and most preferably at least 20 parts, but generally not more than 60 parts, preferably not more than 50 parts, more preferably not more than 45 parts, even more preferably not more than 40 parts, and most preferably not more than 35 parts. Too much component B relative to component A may make the ball too hard, giving it an unpleasant feel upon impact. On the other hand, too little component B may make the ball too soft, lowering its flight performance and durability.

Component C in the invention is an organosulfur compound. Exemplary organosulfur compounds include thiophenols, thionaphthols, halogenated thiophenols, and metal salts thereof. Specific examples include pentachlorothiophenol, pentafluorothiophenol, pentabromothiophenol, p-chlorothiophenol, and the zinc salts thereof; diphenylpolysulfides, dibenzylpolysulfides, dibenzoylpolysulfides, dibenzothiazoylpolysulfides and dithiobenzoylpolysulfides having 2 to 4 sulfurs; alkylphenyldisulfides, furan ring-bearing organosulfur compounds and thiophene ring-bearing organosulfur compounds. Diphenyldisulfide and the zinc salt of pentachlorothiophenol are especially preferred. These may be used singly or as combinations of two or more thereof.

The amount of component C (when two or more are used together, the combined amount thereof) per 100 parts by weight of above component A is generally at least 0.1 part, preferably at least 0.2 part, more preferably at least 0.4 part, even more preferably at least 0.7 part, and most preferably at least 0.9 part, but generally not more than 5 parts, preferably not more than 4 parts, more preferably not more than 3 parts, even more preferably not more than 2 parts, and most preferably not more than 1.5 parts. Too little component C may fail to provide a resilience-improving effect, whereas too much may result in an excessively low hardness and thus insufficient resilience.

Component D in the invention is an inorganic filler, illustrative examples of which include zinc oxide, barium sulfate and calcium carbonate. The amount of component D per 100 parts of component A is generally at least 5 parts, preferably at least 7 parts, more preferably at least 10 parts, and most preferably at least 13 parts, but generally not more than 80 parts, preferably not more than 65 parts, more preferably not more than 50 parts, and most preferably not more than 40 parts. The use of too much or too little component D relative to the base rubber serving as component A may make it impossible to achieve a golf ball having the proper weight and a desirable rebound.

It is preferable for two or more organic peroxides to be used as component E. If (p) represents the organic peroxide having the shortest half-life at 155° C., (q) represents the organic peroxide having the longest half-life at 155° C., and the half-lives of (p) and (q) are denoted as $p_t$ and $q_t$ respectively, the half-life ratio $q_t/p_t$ is generally at least 7, preferably at least 8, more preferably at least 9, and most preferably at least 10, but generally not more than 20, preferably not more than 18, and more preferably not more than 16. Even with the use of two or more organic peroxides, at a half-life ratio outside of the above range, the desired levels of ball rebound, compression and durability may not be achieved.

Organic peroxide (p) has a half-life $p_t$ at 155° C. of generally at least 5 seconds, preferably at least 10 seconds, and more preferably at least 15 seconds, but generally not more than 120 seconds, preferably not more than 90 seconds, and more preferably not more than 60 seconds.

Organic peroxide (q) has a half-life $q_t$ at 155° C. of generally at least 300 seconds, preferably at least 360 seconds, and more preferably at least 420 seconds, but generally not more than 800 seconds, preferably not more than 700 seconds, and more preferably not more than 600 seconds.

Specific examples of the organic peroxides include dicumyl peroxide, 1,1-bis(t-butylperoxy)-3,3,5-trimethylcyclohexane and α,α'-bis(t-butylperoxy)diisopropylbenzene. These organic peroxides may be commercially available products, such as Percumyl D (available from NOF Corporation), Perhexa 3M (NOF Corporation) and Luperco 231XL (available from Atochem Co.). The use of 1,1-bis(t-butylperoxy)-3,3,5-trimethylcyclohexane as above organic peroxide (p) and dicumyl peroxide as above organic peroxide (q) is preferred.

The overall amount of organic peroxide which includes above components (p) and (q) per 100 parts of component A is generally at least 0.1 part, preferably at least 0.2 part, more preferably at least 0.3 part, and even more preferably at least 0.4 part, but generally nor more that 0.8 part, preferably not more than 0.7 part, more preferably not more than 0.6 part, and even more preferably not more than 0.5 part. Too little organic peroxide may increase the time required for crosslinking, substantially lowering productivity during manufacture of the golf ball and also significantly lowering compression. On the other hand, too much organic peroxide may lower the rebound and durability.

It is desirable for the amount of organic peroxide (p) per 100 parts of component A to be generally at least 0.05 part, preferably at least 0.08 part, and more preferably at least 0.1 part, but not more than 0.5 part, preferably not more than 0.4 part, and more preferably not more than 0.3 part. It is desirable for the amount of organic peroxide (q) per 100 parts of component A to be generally at least 0.05 part, preferably at least 0.15 part, and more preferably at least 0.2 part, but generally not more than 0.7 part, preferably not more than 0.6 part, and more preferably not more than 0.5 part.

If necessary, the rubber composition may include also an antioxidant in an amount, per 100 parts of component A, of at least 0.05 part, preferably at least 0.1 part, and more preferably at least 0.2 part, but not more than 3 parts, preferably not more than 2 parts, more preferably not more than 1 part, and most preferably not more than 0.5 part. The antioxidant may be a commercially available product, such as Nocrac NS-6, Nocrac NS-30 (both made by Ouchi Shinko Chemical Industry Co., Ltd.), and Yoshinox 425 (made by Yoshitomi Pharmaceutical Industries, Ltd.).

To increase the hardness difference between the surface of the core and the center of the core and to enable the ball to achieve even less spin, it is advantageous to use as the core of the inventive golf ball a molded and vulcanized rubber composition which includes also, in addition to the above-described formulation, 0.05 to 5 parts by weight, preferably 0.08 to 3 parts by weight, and more preferably 0.1 to 1 part by weight, of sulfur per 100 parts by weight of the base rubber.

The core of the inventive golf ball can be obtained by vulcanizing and curing the above-described rubber composition using a method like that used with known golf ball rubber compositions. For example, vulcanization may be carried out at a temperature of 100 to 200° C. for a period of 10 to 40 minutes.

To improve the resistance of the ball to cracking, it is advantageous for the intermediate layer and/or cover in the inventive golf ball to be made of respective ionomer resin-containing thermoplastic resins. By using such materials, even when a thin, hard cover is employed in the ball, adhesion between the intermediate layer and cover can be enhanced, making it possible to achieve a better resistance to cracking.

The material formulation of this type making up the intermediate layer is preferably one of the following formulations X, Y and Z.

Formulation X:

(a) 100 parts by weight of an olefin-unsaturated carboxylic acid random copolymer and/or an olefin-unsaturated carboxylic acid-unsaturated carboxylic acid ester random copolymer, (b) 5 to 80 parts by weight of a fatty acid having a molecular weight of at least 280 or a derivative thereof, and (c) 0.1 to 10 parts by weight of a basic inorganic metal compound capable of neutralizing acid groups on components (a) and (b).

Formulation Y:

(d) 100 parts by weight of a metal ion neutralization product of an olefin-unsaturated carboxylic acid random copolymer and/or a metal ion neutralization product of an olefin-unsaturated carboxylic acid-unsaturated carboxylic acid ester random copolymer, (b) 5 to 80 parts by weight of a fatty acid having a molecular weight of at least 280 or a derivative thereof, and (c) 0.1 to 10 parts by weight of a basic inorganic metal compound capable of neutralizing acid groups on components (d) and (b).

Formulation Z:

100 parts by weight of a mixture of (a) an olefin-unsaturated carboxylic acid random copolymer and/or an olefin-unsaturated carboxylic acid-unsaturated carboxylic acid ester random copolymer with (d) a metal ion neutralization product of an olefin-unsaturated carboxylic acid random copolymer and/or a metal ion neutralization product of an olefin-unsaturated carboxylic acid-unsaturated carboxylic acid ester random copolymer, (b) 5 to 80 parts by weight of a fatty acid having a molecular weight of at least 280 or a derivative thereof, and (c) 0.1 to 10 parts by weight of a basic inorganic metal compound capable of neutralizing acid groups on components (a), (d) and (b).

Above component (a) is an olefin-containing copolymer. The olefin in component (a) is exemplified by olefins having at least 2, but not more than 8, and preferably not more than 6, carbons. Specific examples include ethylene, propylene, butene, pentene, hexene, heptene and octene. Ethylene is especially preferred.

The unsaturated carboxylic acid in component (a) is exemplified by acrylic acid, methacrylic acid, maleic acid and fumaric acid. Acrylic acid and methacrylic acid are especially preferred.

The unsaturated carboxylic acid ester in component (a) is exemplified by lower alkyl esters of the foregoing unsaturated carboxylic acids. Specific examples include methyl methacrylate, ethyl methacrylate, propyl methacrylate, butyl methacrylate, methyl acrylate, ethyl acrylate, propyl acrylate and butyl acrylate. Butyl acrylate (n-butyl acrylate, i-butyl acrylate) are especially preferred.

The unsaturated carboxylic acid content ("acid content") within the random copolymer serving as component (a) is generally at least 2 wt %, preferably at least 6 wt %, and more preferably at least 8 wt %, but generally not more than 25 wt %, preferably not more than 20 wt %, and more preferably not more than 15 wt %. An acid content which is too low may result in a decreased resilience, and an acid content which is too high may lower the processability of the material.

Above component (d) can be obtained by partially neutralizing acid groups on the random copolymer of above component (a) with metal ions.

Illustrative examples of metal ions for neutralizing the acid groups include $Na^+$, $K^+$, $Li^+$, $Zn^{2+}$, $Cu^{2+}$, $Mg^{2+}$, $Ca^{2+}$, $Co^{2+}$, $Ni^{2+}$ and $Pb^{2+}$. Preferred metal ions include $Na^+$, $Li^+$, $Zn^{2+}$, $Mg^{2+}$ and $Ca^{2+}$. The use of $Zn^{2+}$ is especially preferred.

The degree of neutralization in component (d) (the ratio of neutralized acid groups as a proportion of all acid groups in component (d)), although not subject to any particular limitation, is generally at least 5 mol %, preferably at least 10 mol %, and more preferably at least 20 mol %, but generally not more than 95 mol %, preferably not more than 90 mol %, and more preferably not more than 80 mol %. A degree of neutralization greater than 95 mol % may result in a diminished moldability, whereas a degree of neutralization below 5 mol % necessitates an increase in the amount of inorganic metal compound serving as component (c), which may be undesirable in terms of cost.

As will be mentioned subsequently, an ionomer resin having a relatively low hardness is used as the intermediate layer in the inventive golf ball, but the use of such an ionomer resin which has a high degree of neutralization enables the golf ball to maintain a high rebound.

Commercial products can be advantageously used as above components (a) and (d). Specific examples of commercial products that may be used as the random copolymer in above component (a) include Nucrel AN4311, Nucrel AN4318 and Nucrel 1560 (all products of DuPont-Mitsui Polychemicals Co., Ltd.). Commercial products that may be used as the neutralization product of a random copolymer in component (d) include Himilan 1554, Himilan 1557, Himilan 1601, Himilan 1605, Himilan 1706, Himilan 1855, Himilan 1856 and Himilan AM7316 (all products of DuPont-Mitsui Polychemicals Co., Ltd.); and Surlyn 6320, Surlyn 7930 and Surlyn 8120 (all products of E.I. DuPont de Nemours and Company). Of these, zinc-neutralized ionomer resins (e.g., Himilan AM7316) are preferred.

In the invention, above formulation Z is prepared by blending together components (a) and (d). The blending ratio is not subject to any particular limitation, although the weight ratio of component (a) to component (d) (a:d) is generally from 10:90 to 90:10, and preferably from 20:80 to 80:20.

Component (b) is a fatty acid having a molecular weight of at least 280 or a derivative thereof. This component, which has an extremely small molecular weight compared to above components (a) and/or (d), helps improve the flow properties of the heated mixture. Given that the fatty acid (fatty acid derivative) in component (b) has a molecular weight of at least 280 and a high content of acid groups (or derivatives thereof), the loss of rebound due to its addition is small.

This component (b) may be an unsaturated fatty acid (or fatty acid derivative) containing a double bond or triple bond on the alkyl moiety, or it may be a saturated fatty acid (or derivative thereof) in which the bonds on the alkyl moiety are all single bonds.

The number of carbons on the molecule is generally at least 18, but not more than 80, and preferably not more than 40. Too few carbons may compromise the heat resistance and may also make the acid group ratio so high as to keep the desired flow properties from being achieved on account of interactions with acid groups on components (a) and/or (d). On the other hand, too many carbons increases the molecular weight, which may lower the flow properties and make the material difficult to use.

Specific examples of the fatty acid of component (b) include stearic acid, 12-hydroxystearic acid, behenic acid, oleic acid, linoleic acid, linolenic acid, arachidic acid and lignoceric acid. Of these, stearic acid, arachidic acid, behenic acid and lignoceric acid are preferred.

Specific examples of the fatty acid derivatives of component (b) include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred.

Alternatively, it is possible to use, as above component (a) and/or component (d) and as component (b), a known metallic soap-modified ionomer resin (including those mentioned in U.S. Pat. No. 5,312,857, U.S. Pat. No. 5,306,760 and International Application WO 98/46671.

Component (c) is a basic inorganic metal compound which can neutralize acid groups in component (a) and/or component (d), and in component (b). When component (a) and/or (d) and component (b) are mixed under heating without the inclusion of component (c), fatty acids sometimes form as a result of transesterification. Because the fatty acids have a low thermal stability and readily vaporize during molding, they may cause molding defects. Moreover, when these fatty acids adhere to the surface of the molded article, they may substantially lower paint film adhesion. Component (c) is preferably incorporated so as to resolve such problems.

Illustrative examples of basic inorganic metal compounds that may be used as component (c) in the invention include magnesium oxide, magnesium hydroxide, magnesium carbonate, zinc oxide, sodium hydroxide, sodium carbonate, calcium oxide, calcium hydroxide, lithium hydroxide and lithium carbonate. Of these, a monoxide or a hydroxide is desirable. Magnesium oxide and calcium hydroxide, both of which have a high reactivity with ionomer resins, are preferred. Calcium hydroxide is especially preferred.

Here, component (c) neutralizes the acid groups on above component (a), component (b) or component (d). To achieve both a high degree of neutralization and good flow properties, it is advantageous for transition metal ions and alkali metal and/or alkaline earth metal ions to be used together as the metal ions included in component (c). Because transition metal ions have a weaker ionic cohesion than alkali metal ions and alkaline earth metal ions, in addition to neutralizing some of the acid groups in the heated mixture, they can substantially improve the flow properties.

The ratio of the transition metal ions to the alkali metal and/or alkaline earth metal ions, i.e., the molar ratio (transition metal ions):(alkali metal and/or alkaline earth metal ions), is generally from 10:90 to 90:10, and preferably from 20:80 to 80:20. Too low a molar ratio of transition metal ions may fail to provide sufficient improvement in the flow properties. On the other hand, a molar ratio that is too high may lower the resilience.

As described above, the material making up the intermediate layer in the invention is preferably a mixture of component (a) and/or (d) with components (b) and (c). From the standpoint of thermal stability, moldability and resilience, the acid groups in the mixture have a degree of neutralization (the ratio of neutralized acid groups as a proportion of all the acid groups in the material obtained by mixing component (a) and/or (d) with components (b) and (c)) of generally at least 70 mol %, preferably at least 80 mol %, and more preferably at least 90 mol %. Such a high degree of neutralization effectively inhibits the transesterification that undesirably arises when component (a) and/or (b) are mixed with a fatty acid (or fatty acid derivative) alone and heated, thus making it possible to prevent fatty acid formation. As a result, there can be obtained a material which has a dramatically improved thermal stability, good moldability, and a much higher resilience than prior-art ionomer resins.

Various additives may also be optionally included in the intermediate layer and/or cover material of the inventive golf ball. Examples of such additives include pigments, dispersants, antioxidants, ultraviolet absorbers and light stabilizers.

Moreover, to improve the feel of the golf ball at the time of impact, various non-ionomeric thermoplastic elastomers may be added to the above essential ingredients. Illustrative examples of such non-ionomeric thermoplastic elastomers include olefin thermoplastic elastomers, styrene thermoplastic elastomers, ester thermoplastic elastomers, urethane thermoplastic elastomers and amide thermoplastic elastomers. The use of olefin thermoplastic elastomers and ester thermoplastic elastomers is especially preferred.

Examples of commercial products that may be used as such non-ionomeric thermoplastic elastomers include olefin thermoplastic elastomers such as Dynaron (manufactured by JSR Corporation) and ester thermoplastic elastomers such as Hytrel (manufactured by DuPont-Toray Co., Ltd.).

It is advantageous for formulation X to be composed of 100 parts by weight of component (a); at least 5 parts by weight, and preferably at least 8 parts by weight, but not more than 80 parts by weight, preferably not more than 40 parts by weight, and more preferably not more than 20 parts by weight, of component (b); and at least 0.1 part by weight, and preferably at least 1 part by weight, but not more than 10 parts by weight, and preferably not more than 5 parts by weight of component (c).

It is advantageous for formulation Y to be composed of 100 parts by weight of component (d); at least 5 parts by weight, and preferably at least 8 parts by weight, but not more than 80 parts by weight, preferably not more than 40 parts by weight, and more preferably not more than 20 parts by weight, of component (b); and at least 0.1 part by weight, and preferably at least 0.5 part by weight, but not more than 10 parts by weight, and preferably not more than 5 parts by weight of component (c).

It is advantageous for formulation Z to be composed of 100 parts by weight of components (a) and (d); at least 5 parts by weight, and preferably at least 8 parts by weight, but not more than 80 parts by weight, preferably not more than 40 parts by weight, and more preferably not more than 20 parts by weight, of component (b); and at least 0.1 part by weight, and preferably at least 0.7 part by weight, but not more than 10 parts by weight, and preferably not more than 5 parts by weight of component (c).

In each of the above formulations X to Z, too little component (b) may lower the melt viscosity and diminish processability, whereas too much may lower the durability. Too little component (c) may fail to yield an observable improvement in thermal stability and resilience, whereas too much results in an excessive amount of basic inorganic metal compound, which may actually diminish the heat resistance of the heated mixture and make it more troublesome to use.

The amount of ionomer resin in the thermoplastic resin making up the intermediate layer is generally at least 30 wt %, preferably at least 40 wt %, and more preferably at least 50 wt %. The upper limit is generally 100 wt %, preferably not more than 90 wt %, and more preferably not more than 80 wt %. The amount of ionomer resin in the thermoplastic resin making up the cover is generally at least 50 wt %, preferably at least 70 wt %, and more preferably at least 80 wt %. If the ionomer resin content within the thermoplastic resin making up the intermediate layer falls outside the above range, the golf ball may have a lower resistance to cracking and a lower rebound.

It is preferable to use above formulation X, Y or Z as the thermoplastic resin formulation making up the intermediate layer. By using a highly neutralized ionomer resin in the intermediate layer, there can be obtained an intermediate layer which is both soft and has a high resilience.

It is desirable to include barium sulfate in the thermoplastic resin making up the cover. The amount included per 100 parts by weight of the cover material is generally at least 5 parts by weight, preferably at least 10 parts by weight, and more preferably at least 15 parts by weight, but generally not more than 35 parts by weight, preferably not more than 30 parts by weight, and more preferably not more than 25 parts by weight. By including such an amount of barium sulfate in the cover material, the resistance of the golf ball to cracking can be improved.

The above-described intermediate layer material and/or cover material may be obtained by heating and working together the respective materials in accordance with a known method using an internal mixer such as a twin-screw extruder, Banbury mixer or kneader, and under suitable conditions, such as a heating temperature of 150 to 250° C.

The golf ball of the invention is produced using the above-described intermediate layer material and/or cover material. The intermediate layer and the cover may each be formed by any suitable process, such as injection molding or compression molding. When an injection molding process is employed, this may involve precisely positioning a prefabricated solid core within a mold, then injecting the above-described material into the mold. When a compression molding process is employed, this may involve fabricating a pair of half-cups from the above material, enclosing the core within these cups, either directly or together with an intervening intermediate layer, then molding under heat and pressure in a mold.

The golf ball of the invention having a core, an intermediate layer enclosing the core, and a cover enclosing the intermediate layer is thus formed using the respective, above-described materials. Because the inventive golf ball has an optimized core diameter (above condition (1)), core hardness (above condition (2)), intermediate layer thickness (above condition (3)), intermediate layer hardness (above condition (4)), cover thickness (above condition (5)), cover hardness (above condition (6)) and golf ball hardness (condition (7)), and also has a proper balance of core hardness to golf ball hardness (above condition (8)), it achieves a high rebound, low spin and good feel upon impact, making it suitable for the ordinary amateur golfer who places greater importance on the distance and feel of the ball than its spin performance.

To provide even better golf balls, it is preferable to additionally satisfy following conditions (9) to (12):

(9) (Shore D hardness of cover)−(Shore D hardness of intermediate layer)≧10;
(10) 10≦(Shore D hardness at core surface)−(Shore D hardness at core center)≦30;
(11) an intermediate layer and a cover having melt flow rates of at least 1.6 dg/min; and
(12) an intermediate layer and cover having a combined thickness of at least 1.20 mm but not more than 2.8 mm.

Condition (1):

In the golf ball of the invention, the core has a diameter of at least 36.7 mm, preferably at least 36.9 mm, and more preferably at least 37.5, but not more than 40.7 mm, preferably not more than 39.7 mm, and more preferably not more than 38.7 mm. The objects of the invention cannot be achieved at a core diameter of less than 36.7 mm because the resulting ball has a relatively thick intermediate layer and cover and thus a lower rebound, poor feel or increased spin. Nor can the objects of the invention be achieved at a core diameter of more than 40.7 mm, given that the resulting ball has a relatively thin intermediate layer and cover, and thus a lower resistance to cracking and a lower rebound.

Condition (2):

In the golf ball of the invention, the core has a deflection when subjected to a load of 100 kg of at least 3.5 mm, preferably at least 3.7 mm, and more preferably at least 3.9 mm, but not more than 6.0 mm, preferably not more than 5.5 mm, and more preferably not more than 5.0 mm. The objects of the invention cannot be achieved at a core deflection under a 100 kg load of less than 3.5 mm because the resulting ball is too hard and thus has a poor feel, in addition to which it has increased spin and a shorter carry. Nor can the objects of the invention be achieved at a deflection greater than 6.0 mm, owing to the lower rebound and shorter carry of the resulting ball and to the ball's lower resistance to cracking.

Condition (3):

In the golf ball of the invention, the intermediate layer has a thickness of at least 0.50 mm, preferably at least 0.70 mm, and more preferably 0.80 mm, but not more than 1.4 mm, preferably not more than 1.30 mm, and more preferably not more than 1.25 mm. The objects of the invention cannot be achieved at an intermediate layer thickness of less than 0.50 mm because the resulting ball has a lower resistance to cracking and a poor feel upon impact. Moreover, the objects of the invention cannot be attained at an intermediate layer thickness of more than 1.40 mm, owing to the increased spin and lower rebound, and thus shorter carry, of the resulting ball.

Condition (4):

In the golf ball of the invention, the intermediate layer has a Shore D hardness of at least 40, and preferably at least 42, but not more than 55, preferably not more than 50, and more preferably not more than 47. The objects of the invention cannot be achieved at an intermediate layer Shore D hardness of less than 40 because the resulting ball has a lower rebound and increased spin, reducing the carry. Nor can the objects of the invention be achieved at an intermediate layer Shore D hardness of more than 55 because the hardness is excessive, giving the ball a poor feel.

Condition (5):

In the golf ball of the invention, the cover has a thickness of at least 0.50 mm, preferably at least 0.70 mm, and more preferably at least 0.80 mm, but not more than 1.40 mm, preferably not more than 1.30 mm, and more preferably not more than 1.25 mm. The objects of the invention cannot be attained at a cover thickness of less than 0.50 mm because the resulting ball has a lower resistance to cracking and a lower rebound. Nor can the objects of the invention be achieved at a cover thickness of more than 1.40 mm because the resulting ball has a poor feel and an increased spin that reduces the carry.

Condition (6):

In the golf ball of the invention, the cover has a Shore D hardness of at least 60, and preferably at least 63, but not more than 70, preferably not more than 68, and more preferably not more than 66. The objects of the invention cannot be achieved at a Shore D hardness of less than 60 because the resulting ball takes on too much spin or has a poor rebound, resulting in a shorter carry, in addition to which it has a poor scuff resistance. Nor can the objects of the invention be achieved at a Shore D hardness of more than 70, inasmuch as the resulting ball has a lower resistance to cracking when repeatedly struck and has a poor feel in a short game or when hit with a putter.

A hard cover tends to result in a high rebound and low spin, but also tends to give the ball a hard feel. By designing the golf ball so as to satisfy above conditions (3) to (6) and also making the core and intermediate layer somewhat soft, there can be achieved a golf ball having a high rebound, a low spin and a soft feel.

Condition (7):

The golf ball of the invention has a deflection when subjected to a load of 100 kg of at least 2.8 mm, preferably at least 3.0 mm, and more preferably at least 3.3 mm, but not more than 4.5 mm, preferably not more than 4.0 mm, and more preferably not more than 3.8 mm. The objects of the invention cannot be achieved at a deflection under a load of 100 kg of less than 2.8 mm because the golf ball has a hard feel and also has an increased spin, which shortens the carry. Nor can the objects of the invention be achieved at a deflection of more than 4.5 mm, owing to the lower rebound and thus shorter carry of the resulting ball and to its lower resistance to cracking.

Condition (8):

In the golf ball of the invention, the value represented as (deflection by core under a 100 kg load)−(deflection by golf ball under 100 kg load) is less than 1.0 mm, preferably less than 0.8, and more preferably less than 0.7. If the (deflection by core under 100 kg load)−(deflection by golf ball under 100 kg load) value is large, even when the golf ball itself has a reduced spin, the respective deflections by the core and the cover at the time of impact will differ considerably, increasing the loss of energy and lowering the rebound. In the golf ball of the invention, by making both the intermediate layer and the cover thinner and giving the intermediate layer a lower hardness, the hardness difference can be kept small, the decline in rebound on account of differing amounts of deflection by the core and the cover at the time of impact can be checked; and a soft feel and reduced spin can be achieved.

Condition (9):

In the inventive golf ball, the (Shore D hardness of cover)−(Shore D hardness of intermediate layer) value is generally at least 10, preferably at least 15, and more preferably at least 18. At a value of less than 10, if the cover is too soft, the golf ball may have increased spin and decreased rebound; if the intermediate layer is too hard, the feel of the ball may worsen.

Condition (10):

In the inventive golf ball, the (Shore D hardness at core surface)−(Shore D hardness at core center) value is generally at least 10, and preferably at least 12, but generally not more than 30, preferably not more than 25, and more preferably not more than 20. At a value of less than 10, there may be an increase in spin and a decrease in carry. On the other hand, at a value of more than 30, the resistance to cracking may decline.

Thus, by setting the difference (Shore D hardness at core surface)−(Shore D hardness at core center) to a large value, an even further reduction in the spin of the golf ball may be achieved.

Condition (11):

In the inventive golf ball, the intermediate layer and the cover have melt flow rates (sometimes abbreviated hereinafter as "MFR") of generally at least 1.6 dg/min, preferably at least 1.8 dg/min, and even more preferably at least 2.5 dg/min. At a melt flow rate of less than 1.6 dg/min, molding may be difficult and the molded ball may have a reduced sphericity, which can increase the variability of flight. "Melt flow rate," as used herein, refers to the value measured in general accordance with JIS-K6760 at a test temperature of 190° C. and a test load of 21.18 N (2.16 kgf).

When such intermediate layer and cover materials having good flow properties are used, a good moldability can be achieved even when the layer being molded is thin.

Condition (12):

In the inventive golf ball, the intermediate layer and cover have a combined thickness of generally at least 1.20 mm, preferably at least 1.30 mm, and more preferably at least 1.50 mm, but generally not more than 2.80 mm, preferably not more than 2.70 mm, and more preferably not more than 2.45 mm. At a combined thickness of less than 1.20 mm, the ball has a poor resistance to cracking when repeatedly struck. On the other hand, at a combined thickness of more than 2.80 mm, when struck with a number one wood, the ball takes on more spin, which shortens its carry.

The surface of the inventive ball may have numerous dimples formed thereon by a conventional method. No particular limitation is imposed on dimple characteristics such as shape and total number. For example, the dimples arranged on a single ball may be all of one type, or may be of two or more types, and preferably two to six or more types, of differing diameter and/or depth. Regardless of whether there are differing types of dimples, it is recommended that the dimple diameter be in a range of generally 2.0 to 5.0 mm, and preferably 2.2 to 4.5 mm. The dimple shape can be adjusted so as to give a depth in a range of generally 0.1 to 0.3 mm, and preferably 0.11 to 0.25 mm. The total number of these dimples can be set at generally from 250 to 500, and preferably from 300 to 470. The dimples are generally circular in shape, although they may have other shapes which are non-circular, such as elliptical, oval or polygonal shapes. The surface of the ball may be administered various treatment such as surface preparation, stamping and painting. Such operations can be easily carried out, particularly when performed on a cover made of the above-described heated mixture.

The golf ball of the invention can be manufactured in accordance with the Rules of Golf for use in competitive play, in which case the ball may be formed to a diameter of not less than 42.67 mm and a weight of not more than 45.93 g. The upper limit in the diameter is preferably not more than 44.0 mm, more preferably not more than 43.5 mm, and most preferably not more than 43.0 mm. The lower limit in the weight is preferably not less than 44.5 g, more preferably not less than 45.0 g, even more preferably not less than 45.1 g, and most preferably not less than 45.2 g.

vulcanized at 165° C. for 15 minutes, and the other formulations were vulcanized at 155° C. for 15 minutes.

Intermediate layer materials and cover materials of the formulations shown in Tables 3 and 4 were injection molded over these cores to form three-piece solid golf balls. Tables 5 and 6 show the results of evaluations carried out on the resulting golf balls.

TABLE 1

| Components | | Core formulations | | | | | | | |
|---|---|---|---|---|---|---|---|---|---|
| | (pbw) | A | B | C | D | E | F | G | H |
| Base rubber | BR730 | 100 | 100 | 100 | 100 | 85 | 85 | 100 | 100 |
| | BR01 | | | | | | | | |
| | BR11 | | | | | | | | |
| | IR2200 | | | | | 15 | 15 | | |
| Metal salt of unsaturated carboxylic acid | Zinc acrylate | 26.7 | 21.8 | 24.7 | 19.8 | 23.9 | 16.3 | 27.6 | 22.7 |
| Sulfur | | | | | | 0.1 | 0.1 | | |
| Organosulfur compound | Zinc salt of pentachlorothiophenol | 1.0 | 1.0 | 1.0 | 1.0 | 2.5 | 2.5 | 1.0 | 1.0 |
| Inorganic fillers | Zinc oxide | 22.8 | 24.8 | 27.0 | 29.0 | 22.5 | 25.6 | 20.9 | 22.9 |
| | Barium sulfate | | | | | | | | |
| Organic peroxides | Perhexa 3M-40 | 0.3 | 0.3 | 0.3 | 0.3 | 1.2 | 1.2 | 0.3 | 0.3 |
| | Percumyl D | 0.3 | 0.3 | 0.3 | 0.3 | 1.2 | 1.2 | 0.3 | 0.3 |
| Antioxidant | Nocrac NS-6 | 0.1 | 0.1 | 0.1 | 0.1 | | | 0.1 | 0.1 |
| Fatty acid derivative | Zinc stearate | 5.0 | 5.0 | 5.0 | 5.0 | 5.0 | 5.0 | 5.0 | 5.0 |

TABLE 2

| Components | | Core formulations | | | | | |
|---|---|---|---|---|---|---|---|
| | (pbw) | I | J | K | L | M | N |
| Base rubber | BR730 | | | | | 100 | |
| | BR01 | 50 | 50 | 50 | 50 | | 50 |
| | BR11 | 50 | 50 | 50 | 50 | | 50 |
| | IR2200 | | | | | | |
| Metal salt of unsaturated carboxylic acid | Zinc acrylate | 24.0 | 15.8 | 24.6 | 23.7 | 25.3 | 26.6 |
| Sulfur | | | | | | | |
| Organosulfur compound | Zinc salt of pentachlorothiophenol | | | | 1.0 | 1.0 | 1.0 |
| Inorganic fillers | Zinc oxide | 5.0 | 5.0 | 29.3 | 30.0 | 22.7 | 28.5 |
| | Barium sulfate | 28.6 | 31.9 | | | | |
| Organic peroxides | Perhexa 3M-40 | 0.6 | 0.6 | 0.6 | 0.3 | 0.3 | 0.6 |
| | Percumyl D | 0.6 | 0.6 | 0.6 | 0.3 | 0.3 | 0.6 |
| Antioxidant | Nocrac NS-6 | 0.2 | 0.2 | 0.1 | 0.1 | 0.1 | 0.1 |
| Fatty acid derivative | Zinc stearate | | | | | 5.0 | |

EXAMPLE

The following Examples and Comparative Examples are provided by way of illustration and not by way of limitation.

Examples 1 to 8, and Comparative Examples 1 to 8

Rubber compositions having the formulations (in parts by weight) shown in Tables 1 and 2 were vulcanized to form the cores of three-piece golf balls. Formulations E and F were The materials mentioned in Tables 1 and 2 are described below.

BR730: A polybutadiene rubber produced by JSR Corporation. Polymerization catalyst, neodymium system; cis-1,4 unit content, 96%; Mooney viscosity ($ML_{1+4}$ (100° C.)), 55.

BR01: A polybutadiene rubber produced by JSR Corporation. Polymerization catalyst, nickel system; cis-1,4 unit content, 96%; Mooney viscosity ($ML_{1+4}$ (100° C.)), 44.

BR11: A polybutadiene rubber produced by JSR Corporation. Polymerization catalyst, nickel system; cis-1,4 unit content, 96%; Mooney viscosity ($ML_{1+4}$ (100° C.)), 44.

IR2200: A polyisoprene rubber produced by JSR Corporation.

Perhexa 3M-40: An organic peroxide (40% dilution) produced by NOF Corporation.

Percumyl D: An organic peroxide produced by NOF Corporation.

Nocrac NS-6: An antioxidant produced by Ouchi Shinko Chemical Industry Co., Ltd.

TABLE 3

| Components (pbw) | Intermediate layer/Cover formulations | | | | | | | |
|---|---|---|---|---|---|---|---|---|
| | a | b | c | d | E | f | g | h |
| Hytrel 3046 | | | | | | | | |
| Nucrel AN4318 | 60 | | | | | 100 | | 26 |
| Nucrel 1560 | | | | | | | 20 | |
| Dynaron 6100 | | | | | | | | 30 |
| Dynaron 6200 | 30 | | | | | | | |
| Dynaron 4630 | 10 | | | | | | | |
| Himilan 1557 | | | 50 | | | | | |
| Himilan 1605 | | | 50 | 50 | 50 | | | |
| Himilan 1706 | | | | 25 | 25 | | | |
| Himilan 1650 | | | | | | | | |
| Himilan 1855 | | | | | | | | |
| Himilan 7930 | | | | | | | 23 | |
| Himilan 7316 | | | | | | 80 | | |
| Himilan 7317 | | | | | | | | |
| Himilan 7318 | | | | | | | | |
| Himilan 7311 | | | | | | | | 21 |
| Surlyn 6320 | | | | | | | | |
| Surlyn 9945 | | | | 25 | 25 | | | |
| Surlyn 8320 | | 100 | | | | | | |
| Surlyn 9650 | | | | | | | | |
| Surlyn 8660 | | | | | | | | |
| Behenic acid | 20 | 20 | | | | 20 | 20 | |
| Calcium hydroxide | 3.5 | 2.6 | | | | 4.8 | 3.3 | |
| Titanium dioxide | 2 | 2 | 2 | 2 | 2 | 2 | 2 | 2 |
| Barium sulfate 300 | | | 20 | | 20 | | | |
| MFR (dg/min) | 2.3 | 2.0 | 3.2 | 4.0 | 3.3 | 1.9 | 4.8 | 2.5 |

TABLE 4

| Components (pbw) | Intermediate layer/Cover formulations | | | | | | |
|---|---|---|---|---|---|---|---|
| | i | j | k | l | M | n | o |
| Hytrel 3046 | | | 100 | | | | |
| Nucrel AN4318 | | | | | | | |
| Nucrel 1560 | | | | | | | |
| Dynaron 6100 | 30 | | | | | | |
| Dynaron 6200 | | | | | | | |
| Dynaron 4630 | | | | | | | |
| Himilan 1557 | | | | | | | |
| Himilan 1605 | | | | | 50 | | |
| Himilan 1706 | | | | | 50 | | |
| Himilan 1650 | | | | | | | 50 |
| Himilan 1855 | | | | | | | 50 |
| Himilan 7930 | | | | | | | |
| Himilan 7316 | | | | | | | |
| Himilan 7317 | | 50 | | | | | |
| Himilan 7318 | | 50 | | | | | |
| Himilan 7311 | | | | 50 | 80 | | |
| Surlyn 6320 | | | | 50 | 20 | | |
| Surlyn 9945 | | | | | | | |
| Surlyn 8320 | | | | | | | |
| Surlyn 9650 | 35 | | | | | | |
| Surlyn 8660 | 35 | | | | | | |
| Behenic acid | | | | | | | |
| Calcium hydroxide | | | | | | | |
| Titanium dioxide | 2 | 2 | | 2 | 2 | 2 | 2 |
| Barium sulfate 300 | | | | | | | |
| MFR (dg/min) | 2.5 | 1.7 | 10.0 | 0.9 | 0.8 | 1.8 | 0.8 |

The materials mentioned in Tables 3 and 4 are described below. In the tables, "MFR" refers to the melt flow rate measured in general accordance with JIS-K6760 at a test temperature of 190° C. and a test load of 21.18 N (2.16 kgf).

Hytrel: Polyester elastomers produced by DuPont-Toray Co., Ltd.

Nucrel: Ionomer resins produced by DuPont-Mitsui Polychemicals Co., Ltd.

Dynaron: Hydrogenated polymers produced by JSR Corporation.

Himilan: Ionomer resins produced by DuPont-Mitsui Polychemicals Co., Ltd.

Surlyn: Ionomer resins produced by E.I. DuPont de Nemours and Company.

Behenic acid: NAA222-S (beads), produced by NOF Corporation.

Calcium hydroxide: CLS-B, produced by Shiraishi Kogyo Kaisha, Ltd.

Barium sulfate 300: Precipitated barium sulfate, produced by Sakai Chemical Industry Co., Ltd.

TABLE 5

| | | Example | | | | | | | |
|---|---|---|---|---|---|---|---|---|---|
| | | 1 | 2 | 3 | 4 | 5 | 6 | 7 | 8 |
| Core | Diameter (mm) | 37.7 | 37.7 | 37.7 | 37.7 | 37.7 | 37.7 | 38.3 | 38.3 |
| | Formulation | A | B | C | D | E | F | G | H |
| | Hardness (100 kg load) (mm) | 3.8 | 4.5 | 4.0 | 4.7 | 3.9 | 4.5 | 3.7 | 4.4 |
| | Center hardness (Shore D) | 34 | 32 | 33 | 31 | 29 | 26 | 34 | 32 |
| | Surface hardness (Shore D) | 41 | 37 | 39 | 36 | 41 | 38 | 41 | 38 |
| Intermediate layer | Thickness (mm) | 1.25 | 1.25 | 1.20 | 1.20 | 1.25 | 1.25 | 1.00 | 1.00 |
| | Hardness (Shore D) | 43 | 43 | 47 | 47 | 43 | 43 | 43 | 43 |
| | Formulation | a | a | b | b | a | a | a | a |
| Core surrounded by intermediate | Diameter (mm) | 40.2 | 40.2 | 40.1 | 40.1 | 40.2 | 40.2 | 40.3 | 40.3 |

TABLE 5-continued

|  |  | Example | | | | | | | |
|---|---|---|---|---|---|---|---|---|---|
|  |  | 1 | 2 | 3 | 4 | 5 | 6 | 7 | 8 |
| layer (sphere) |  |  |  |  |  |  |  |  |  |
| Cover | Thickness (mm) | 1.25 | 1.25 | 1.30 | 1.30 | 1.25 | 1.25 | 1.20 | 1.20 |
|  | Hardness (Shore D) | 63 | 63 | 63 | 63 | 63 | 63 | 65 | 65 |
|  | Formulation | c | c | d | d | c | c | e | e |
| Ball | Diameter (mm) | 42.7 | 42.7 | 42.7 | 42.7 | 42.7 | 42.7 | 42.7 | 42.7 |
|  | Weight (g) | 45.3 | 45.3 | 45.3 | 45.3 | 45.3 | 45.3 | 45.3 | 45.3 |
|  | Hardness (100 kg load) (mm) | 3.2 | 3.8 | 3.2 | 3.8 | 3.3 | 3.8 | 3.1 | 3.7 |
| Core hardness (100 kg load) − Ball hardness (100 kg load) (mm) |  | 0.6 | 0.7 | 0.8 | 0.9 | 0.6 | 0.7 | 0.6 | 0.7 |
| Flight | Spin (rpm) | 2550 | 2420 | 2530 | 2400 | 2500 | 2370 | 2450 | 2310 |
|  | Initial velocity (m/s) | 58.9 | 58.6 | 59.0 | 58.7 | 58.8 | 58.5 | 59.0 | 58.7 |
|  | Carry (m) | 206.5 | 206.3 | 207.2 | 207.0 | 206.7 | 206.8 | 207.5 | 207.8 |
| Resistance to cracking |  | good | good | good | ordinary | good | good | good | ordinary |
| Feel | When hit with a driver | soft | soft | soft | soft | soft | soft | soft | soft |
|  | When putting | soft | soft | soft | soft | soft | soft | soft | soft |

TABLE 6

|  |  | Comparative Example | | | | | | | |
|---|---|---|---|---|---|---|---|---|---|
|  |  | 1 | 2 | 3 | 4 | 5 | 6 | 7 | 8 |
| Core | Diameter (mm) | 36.5 | 36.5 | 36.4 | 36.4 | 36.9 | 37.7 | 37.7 | 37.7 |
|  | Formulation | I | J | N | K | L | C | C | M |
|  | Hardness (100 kg load) (mm) | 3.8 | 5.0 | 3.8 | 4.6 | 4.3 | 4.0 | 4.0 | 4.0 |
|  | Center hardness (Shore D) | 34 | 30 | 34 | 32 | 33 | 33 | 33 | 33 |
|  | Surface hardness (Shore D) | 41 | 35 | 41 | 37 | 39 | 39 | 39 | 39 |
| Intermediate layer | Thickness (mm) | 1.60 | 1.60 | 1.70 | 1.70 | 1.30 |  |  | 1.20 |
|  | Hardness (Shore D) | 50 | 54 | 50 | 54 | 65 |  |  | 27 |
|  | Formulation | f | g | h | i | j |  |  | k |
| Core surrounded by intermediate layer (sphere) | Diameter (mm) | 39.5 | 39.5 | 39.8 | 39.8 | 39.5 |  |  | 40.1 |
| Cover | Thickness (mm) | 1.50 | 1.50 | 1.45 | 1.45 | 1.60 | 2.50 | 2.50 | 1.30 |
|  | Hardness (Shore D) | 54 | 60 | 60 | 63 | 56 | 63 | 47 | 63 |
|  | Formulation | l | m | m | n | o | d | b | d |
| Ball | Diameter (mm) | 42.7 | 42.7 | 42.7 | 42.7 | 42.7 | 42.7 | 42.7 | 42.7 |
|  | Weight (g) | 45.3 | 45.3 | 45.2 | 45.2 | 45.3 | 45.3 | 45.3 | 45.3 |
|  | Hardness (100 kg load) (mm) | 3.1 | 3.6 | 2.9 | 3.1 | 2.9 | 2.7 | 3.5 | 3.5 |
| Core hardness (100 kg load) − Ball hardness (100 kg load) (mm) |  | 0.7 | 1.4 | 0.9 | 1.5 | 1.4 | 1.3 | 0.5 | 0.5 |
| Flight | Spin (rpm) | 2800 | 2600 | 2700 | 2560 | 2760 | 2660 | 2960 | 2800 |
|  | Initial velocity (m/s) | 58.0 | 58.1 | 58.3 | 58.4 | 58.3 | 59.6 | 57.9 | 57.9 |
|  | Carry (m) | 201.3 | 202.8 | 203.0 | 204.5 | 202.8 | 208.0 | 199.5 | 201.2 |
| Resistance to cracking |  | good | good | good | good | good | good | good | NG |
| Feel | When hit with a driver | soft | soft | ordinary | soft | ordinary | hard | soft | soft |
|  | When putting | soft | soft | ordinary | ordinary | ordinary | hard | soft | soft |

The properties shown in Tables 5 and 6 were evaluated as follows.

Hardness (100 kg Load)

Deflection when a load of 100 kg is applied.

Core Center Hardness, Core Surface Hardness

The Shore D hardness, as measured with an ASTM D2240 type D durometer. The hardness at the surface of the core was measured directly. The hardness at the center of the core was measured after cutting the core in half.

Intermediate Layer Hardness and Cover Hardness

The Shore D hardness, as measured with an ASTM D2240 type D durometer. The value in each case is the hardness of the surface of a resin sheet measured in accordance with JIS-6253, not the hardness at the surface of the ball.

Ball Diameter

The maximum diameter of the golf ball, as measured in a dimple-free area on the ball' surface.

Intermediate Layer Thickness

Calculated as the following value:
(diameter of sphere made up of core surrounded by intermediate layer−core diameter)/2

Cover Thickness

Calculated as the following value:
(ball diameter−diameter of sphere made up of core enclosed by intermediate layer)/2

Flight

The spin, initial velocity and carry were measured when the ball was hit at a head speed of 42 m/s with a driver (X-DRIVE TYPE 300 PROSPEC, made by Bridgestone Sports Co., Ltd.; loft angle, 9°) mounted on a swing robot (Miyamae Co., Ltd.). To measure the spin and initial velocity, the ball immediately after impact was photographed using a high-speed camera.

Resistance to Cracking

The ball was repeatedly shot against an iron plate at a velocity of 43 m/s, and the number of impacts until the ball cracked was measured. A commercial ball (PRECEPT Laddie, manufactured by Bridgestone Sports Co., Ltd.) was measured at the same time. The results were rated according to the following criteria.

Good: Results were better than "rdinary."
Ordinary: Number of impacts until ball cracked was within ±5% that for PRECEPT Laddie
Not good (NG): Results were worst than "rdinary."

Feel

The feel of the ball was sensory evaluated by five skilled amateur golfers having handicaps of less than 10, with each golfer assigning the ball a numerical score as follows.

5 points: Very soft
4 points: Soft
3 points: Ordinary; that is, neither hard nor soft
2 points: Somewhat hard
1 point: Hard The average score for each ball was calculated, and the feel was rated based on the following criteria.

Soft: Average score for five golfers was 4 or higher
Ordinary: Average score for five golfers was at least 2, but less than 4
Hard: Average score for five golfers was less than 2

The golf ball in Comparative Example 1 has a soft cover, increasing spin. Moreover, the core is made of a formulation having a poor resilience. The intermediate layer and cover are thick, which also increases spin. As a result, the ball has a poor carry.

The golf ball in Comparative Example 2 has too large a difference in hardness between the ball and the core, which lowers the rebound. Moreover, the core is made of a formulation having poor resilience, in addition to which the intermediate layer and cover are thick, increasing the spin and thus giving the ball a poor carry.

The golf ball in Comparative Example 3 has a thick intermediate layer and cover, which increases spin. Moreover, the core and intermediate layer each has a somewhat poor resilience, which diminishes the carry and feel of the ball.

The golf ball in Comparative Example 4 has a thick intermediate layer and cover, which increases spin. Moreover, the hardness difference between the ball and the core is large, and the core and intermediate layer each have a somewhat poor resilience, thus diminishing the carry and feel of the ball.

The golf ball in Comparative Example 5 has a soft cover, in addition to which the intermediate layer and cover are both thick, which increases spin. Moreover, the hardness difference between the ball and the core is large, resulting in a poor carry and feel.

The golf ball in Comparative Example 6 is a three-piece golf ball in which the cover by itself has a thickness close to the combined thickness of the intermediate layer and cover in the examples according to the invention. Because the hard cover on this ball is thick, the ball has a very hard feel upon impact.

The golf ball in Comparative Example 7 is a three-piece golf ball in which the cover by itself has a thickness close to the combined thickness of the intermediate layer and cover in the examples according to the invention. Because the soft cover on this ball is thick, the ball has an increased spin and a low rebound, resulting in a poor carry.

The golf ball in Comparative Example 8 has an intermediate layer made of a soft polyester. Hence, the spin is large, adhesion with the cover is poor and the rebound is low, resulting in a short carry and poor resistance to cracking.

The invention claimed is:

1. A golf ball, comprising a core, an intermediate layer enclosing the core and a cover enclosing the intermediate layer, wherein the intermediate layer and cover are each made from an ionomer resin-containing thermoplastic resin, wherein the golf ball satisfies following conditions (1) to (9):

(1) the core has a diameter of at least 36.7mm but not more than 40.7 mm;
(2) the core has a deflection when subjected to a load of 100 kg of at least 3.5 but not more than 6.0 mm;
(3) the intermediate layer has a thickness of at least 0.50 mm but not more than 1.40 mm;
(4) the intermediate layer has a Shore D hardness of at least 40 but not more than 55;
(5) the cover has a thickness of at least 0.50 mm but not more than 1.40 mm;
(6) the cover has a Shore D hardness of at least 60 but not more than 70;
(7) the golf ball has a deflection when subjected to a load of 100 kg of at least 2.8 mm but not more than 4.5 mm;
(8) (deflection by core under 100 kg load)−(deflection by golf ball under 100 kg load)<1.0 mm; and
(9) (Shore D hardness of cover)−(Shore D hardness of intermediate layer)≧10;

wherein the core is obtained by molding and vulcanizing a rubber composition comprising 100 parts by weight of a base rubber which includes 60 to 100 wt % of a polybutadiene of at least 60% cis-1,4 structure, has a Mooney viscosity ($ML_{1+4}$ (100° C.)) of at least 40 and is synthesized using a rare earth catalyst, 10 to 60 parts by weight of an unsaturated carboxylic acid and/or an unsaturated carboxylic acid metal salt, 0.1 to 5 parts by weight of an organosulfur compound, 5 to 80 parts by weight of an inorganic filler, and 0.1 to 0.8 part by weight overall of at least two different organic peroxides which have a half-life ratio $q_t/p_t$ of at least 7 but not more than 20, wherein the organic peroxide with the shortest half-life at 155° C. is (p), the organic peroxide with the longest half-life at 155° C. is (q), the half-life of (p) is $p_t$ and the half-life of (q) is $q_t$;

the intermediate layer is made from a thermoplastic resin containing at least 30 wt % of an ionomer resin; and the cover is made from a thermoplastic resin containing at least 50 wt % of an ionomer resin.

2. The golf ball of claim 1 which additionally satisfies following condition (10):

(10) $10 \leq$ (Shore D hardness at core surface)−(Shore D hardness at core center)$\leq 30$.

3. The golf ball of claim 1, wherein the core contains 0.05 to 5 parts by weight of sulfur per 100 parts by weight of the base rubber.

4. The golf ball of claim 1, wherein the intermediate layer is composed of (a) 100 parts by weight of an olefin-unsaturated carboxylic acid random copolymer and/or an olefin-unsaturated carboxylic acid-unsaturated carboxylic acid ester random copolymer, (b) 5 to 80 parts by weight of a fatty acid having a molecular weight of at least 280 or a derivative thereof, and (c) 0.1 to 10 parts by weight of a basic inorganic metal compound capable of neutralizing acid groups on components (a) and (b).

5. 6. The golf ball of claim 1, wherein the intermediate layer is composed of (d) 100 parts by weight of a metal ion neutralization product of an olefin-unsaturated carboxylic acid random copolymer and/or a metal ion neutralization product of an olefin-unsaturated carboxylic acid-unsaturated carboxylic acid ester random copolymer, (b) 5 to 80 parts by weight of a fatty acid having a molecular weight of at least 280 or a derivative thereof, and (c) 0.1 to 10 parts by weight of a basic inorganic metal compound capable of neutralizing acid groups on components (d) and (b).

6. The golf ball of claim 1, wherein the intermediate layer is composed of 100 parts by weight of a mixture of (a) an olefin-unsaturated carboxylic acid random copolymer and/or an olefin-unsaturated carboxylic acid-unsaturated carboxylic acid ester random copolymer with (d) a metal ion neutralization product of an olefin-unsaturated carboxylic acid random copolymer and/or a metal ion neutralization product of an olefin-unsaturated carboxylic acid-unsaturated carboxylic acid ester random copolymer, (b) 5 to 80 parts by weight of a fatty acid having a molecular weight of at least 280 or a derivative thereof, and (c) 0.1 to 10 parts by weight of a basic inorganic metal compound capable of neutralizing acid groups on components (a), (d) and (b).

7. The golf ball of claim 1, wherein the cover includes 5 to 35 parts by weight of barium sulfate per 100 parts by weight of the ionomer resin.

8. The golf ball of claim 1 which additionally satisfies following condition (11):

(11) the intermediate layer and the cover have melt flow rates of at least 1.6 dg/min.

9. The golf ball of claim 1 which additionally satisfies following condition (12):

(12) the intermediate layer and cover have a combined thickness of at least 1.20 mm but not more than 2.80 mm.

10. A golf ball, comprising a core, an intermediate layer enclosing the core and a cover enclosing the intermediate layer, wherein the intermediate layer and cover are each made from an ionomer resin-containing thermoplastic resin, wherein the golf ball satisfies following conditions (1) to (8):

(1) the core has a diameter of at least 36.7 mm but not more than 40.7 mm;

(2) the core has a deflection when subjected to a load of 100 kg of at least 3.5 but not more than 6.0 mm;

(3) the intermediate layer has a thickness of at least 0.50 mm but not more than 1.40 mm;

(4) the intermediate layer has a Shore D hardness of at least 40 but not more than 55;

(5) the cover has a thickness of at least 0.50 mm but not more than 1.40 mm;

(6) the cover has a Shore D hardness of at least 60 but not more than 70;

(7) the golf ball has a deflection when subjected to a load of 100 kg of at least 2.8 mm but not more than 4.5 mm; and (8) (deflection by core under 100 kg load)−(deflection by golf ball under 100 kg load)<1.0 mm; and wherein the core is obtained by molding and vulcanizing a rubber composition comprising 100 parts by weight of a base rubber which includes 60 to 100 wt % of a polybutadiene of at least 60% cis-1,4 structure, has a Mooney viscosity (ML1∝(100° C.)) of at least 40 and is synthesized using a rare earth catalyst, 10 to 60 parts by weight of an unsaturated carboxylic acid and/or an unsaturated carboxylic acid metal salt, 0.1 to 5 parts by weight of an organosulfur compound, 5 to 80 parts by weight of an inorganic filler, and 0.1 to 0.8 part by weight overall of at least two different organic peroxides which have a half-life ratio $q_t/p_t$ of at least 7 but not more than 20, wherein the organic peroxide with the shortest half-life at 155° C is (p), the organic peroxide with the longest half-life at 155° C. is (q), the half-life of (p) is $p_t$ and the half-life of (q) is $q_t$;

the intermediate layer is made from a thermoplastic resin containing at least 30 wt % of an ionomer resin; and the cover is made from a thermoplastic resin containing at least 50 wt % of an ionomer resin.

* * * * *